Feb. 19, 1957  H. C. DOANE  2,781,597
ORNAMENTAL ARTICLE
Filed March 31, 1953

INVENTOR
Harry C. Doane
BY
Stanley E. Ross
ATTORNEYS

United States Patent Office 2,781,597
Patented Feb. 19, 1957

2,781,597
ORNAMENTAL ARTICLE

Harry C. Doane, Flint, Mich., assignor to General Motors Corporation, Detroit, Mich., a corporation of Delaware Application March 31, 1953, Serial No. 345,897

4 Claims. (Cl. 41—35)

This invention relates to improvements in the molding of plastic articles and more particularly to the molding of plastic articles having decorative inserts.

Up to the present time several methods have been employed in the molding of plastic articles such as ornamental buttons, emblems, automobile trim, optical lens, etc. However, certain difficulties have heretofore been encountered in the molding of plastic articles having ornamental inserts. To avoid these difficulties some prior attempts have been made to mold plastic articles to give the appearance of having ornamental inserts embedded therein. A typical method has been to initially mold the plastic into the desired shape having the ornamental features formed during the molding appearing as cavities on one side and in relief on the opposite side. In such a structure, the ornamental features are then masked off, and a coloring or dye is applied to the remainder of the article. The mask is subsequently removed, and the ornamental features are then sprayed with a metallic vapor to produce a structure presenting a third dimensional appearance of either having ornamental metallic inserts molded into the structure or sandwiched between layers of plastic.

However, structures produced by the above-described method are of rather limited utility when exposed to outdoor conditions. Despite a protective backing the coatings fade and loosen, the dye or other coloring material bleaches out, and in a relatively short time the metallic vapor coating disappears. As a result, structures of this type, although originally highly decorative are rendered dull and unattractive in a short time, thus limiting their widespread use where continuing attractiveness under a variety of weather conditions is essential.

Accordingly, one object of this invention is to provide an improved plastic article having ornamental inserts embedded therein. Another object of the invention is to provide a method of molding plastic articles having decorative inserts in which the surface of the inserts exposed to view is completely surrounded by a layer of plastic. Another object is to provide a molded plastic article having improved resistance to weathering conditions. A still further object is to provide a method of forming an ornamental plastic article having decorative inserts mounted therein. These and other objects will become more apparent from the description which follows.

I have discovered that a plastic article having improved resistance to weathering can be manufactured by a method which preferably includes the steps of forming a colored core member having generally the shape desired in the completed article, molding a layer of transparent or translucent plastic over and around the exposed surfaces of this core member to form a unitary watertight structure, and thereafter pressing an ornamental insert member through shaped openings in the core member and into aligned recesses in the plastic coating to obtain a structure in which the core member provides a colored background which will not fade or peel and in which the ornamental insert is protected from exposure while firmly held in place.

The invention will be best understood taken in connection with the accompanying drawing, in which.

Figure 1:
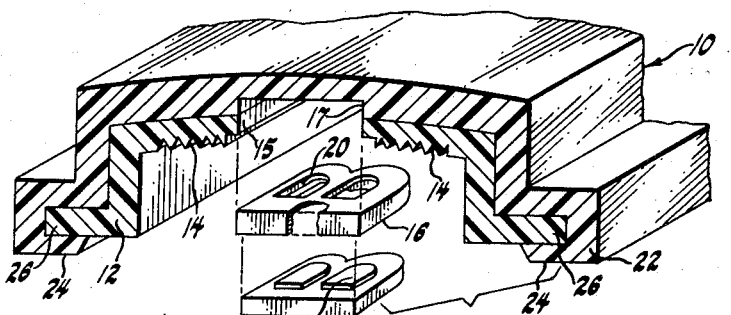
Fig. 1 is a partially exploded, perspective sectional view of a portion of a molded plastic article according to the invention.
Figure 2:
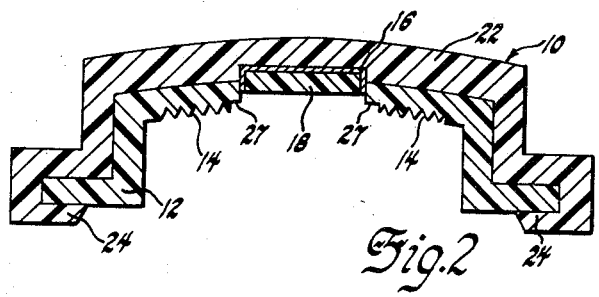
Fig. 2 is a sectional view generally similar to Fig. 1 after an ornamental insert has been pressed into place.

Referring now to the drawing, a plastic article formed according to the present invention and indicated generally at 10, comprises a core member 12 of any suitable material, such as a transparent red colored acrylic type plastic or other thermoplastic material colored to form a background for the inserts in the completed article. The inner member or core 12 has the general shape desired in the final plastic article and, as shown in Fig. 1, preferably has a plurality of longitudinally extending serrations 14 to improve the light reflectiveness of the completed article.

As shown in Fig. 1 the core 12 is provided with a shaped opening 15 adapted to receive an ornamental metallic insert 16. For the particular ornamental insert shown in Fig. 1 an additional plastic insert 18, preferably matching the color of the core 12, is provided to fit within metallic insert 16 in such a manner that the plastic insert 18 extends through the openings 20 to provide a flush appearance in the completed structure. It will be understood, of course, that whether or not such an additional plastic insert 18 is used depends on the type of decorative insert employed. In many instances it is unnecessary. For example, using a metallic insert such as the letter "U" shown at 35 in Fig. 4, an additional plastic insert need not be employed since a flush appearance may be obtained by shaping the opening in the core member to accurately fit around the insert.

In a second molding operation an outer covering 22 is formed about the core 12 in such a manner as to completely protect the surfaces exposed to view in the completed structure. In this molding step the molding die projects through the opening 15 in the core member to form in the outer covering 22 a recess 17 which registers with the core opening. It will be seen that the lips 24 of the molded outer coating 22 extend well around the edge of the core flange 26 to completely seal against the entrance of moisture between the opposing inner surfaces. The outer coating 22 preferably is formed of a transparent plastic such as methylmethacrylate or other acrylic type material. A suitable commercially available plastic is the product known as "Plexiglas" manufactured by Rohm and Haas Company.

Figure 3:
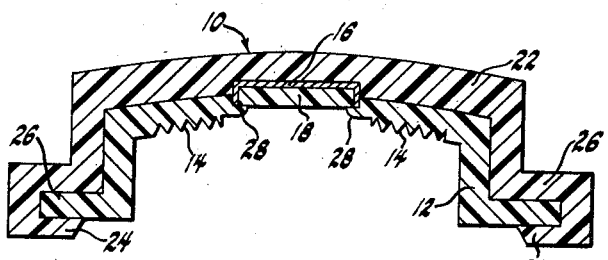
Fig. 3 is a sectional view similar to Fig. 2 showing how the ornament is permanently secured in place.

After the outer coating 22 is molded around the core member 12 an ornamental insert or cap 16 typically formed of polished metal such as aluminum, stainless steel or the like is pressed through the opening 15 in the core member 12 and into recess 17 provided within the outer plastic coating 22 in register with the opening 15 in the core. To permanently secure the insert in place and to prevent entrance of moisture, the edges 27 of the core opening are formed into lips 28 and sealed against the insert as shown in Fig. 3 preferably by application of a heated die against the edges of the core opening 15.

Figure 4:
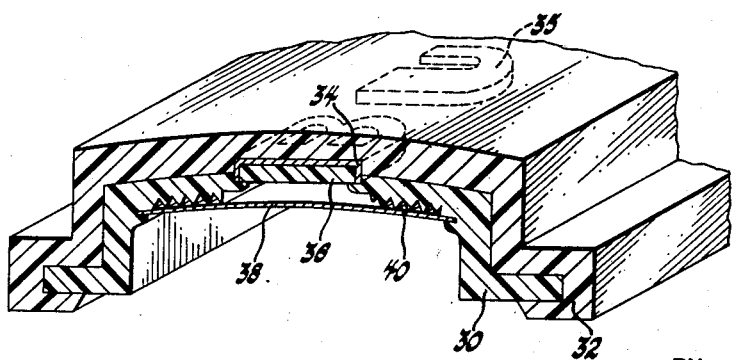
Fig. 4 is a perspective sectional view of a portion of a molded plastic structure illustrating another embodiment of the present invention.

Fig. 4 illustrates a modification of the invention comprising an inner core member 30, an outer coating 32 molded around the core member, an ornamental insert 34 pressed through said core member into a recess in said outer coating, a plastic insert 36, and a metallic plate 38 inserted beneath longitudinally extending serrations 40 to further increase the light reflectivity of the plastic article.

It will be seen from the drawing and the foregoing description that this invention permits the molding of plastic articles having ornamental inserts which extend into preformed recesses in the plastic covering to provide a third dimensional appearance. Further, since the coloring of the plastic article is provided by a through-colored core member, the completed plastic article is extremely resistant to fading, and the luster of the ornamental metallic inserts is not decreased by exposure to moisture.

The manufacture of an article as described herein requires no special fixtures or highly specialized molding equipment but can be easily formed in conventional plastic molding apparatus. Hence, the method is well suited for use in the mass production of plastic articles, such as automobile body decorative emblems, which are exposed to varying climatic conditions and in which an optimum weathering resistance is necessary.

It is to be understood that, although the invention has been described with specific reference to particular embodiments thereof, it is not to be so limited since changes and alterations therein may be made which are within the full intended scope of this invention as defined by the appended claims.

What is claimed is:

1. An ornamental article comprising a shaped core member having an opening therethrough, a layer of transparent plastic material molded around a portion of said core member, said plastic layer having a recessed portion in register with the opening in said core member to provide a shaped cavity, and an ornamental insert member permanently secured within said cavity to provide a third dimensional appearance when viewed through said transparent plastic layer.

2. An ornamental plastic article comprising a core member having generally a convex shape, a layer of clear plastic material molded over a portion of said core member to provide a watertight structure, said core member having an opening therethrough in alignment with an opening in said plastic material to provide a shaped cavity extending well into said clear plastic material, and a decorative metallic insert secured within said cavity.

3. An ornamental article comprising a convexly shaped core member having a shaped opening therethrough, a clear plastic covering molded around a portion of said core member and having a recess in alignment with said opening to provide in the article a shaped cavity accessible from one side of said article, an insert member, comprising a metallic cap and a plastic backing having the same color as the core member positioned within said cavity and held in place by deformed edges of said opening, said core member having longitudinally extending serrations to increase the light reflectiveness of said article.

4. An ornamental article comprising a core member having longitudinally extending serrations and a shaped opening therethrough, a transparent plastic layer around a portion of said core, said plastic layer having a recess in alignment with said opening, a decorative metallic insert positioned within said opening and recess to appear as though embedded in said clear plastic, said core member provided with a reflector adjacent said serrations to augment the light reflectiveness of the article.

References Cited in the file of this patent

UNITED STATES PATENTS

| | | |
|---|---|---|
| 701,492 | Matthes | June 3, 1902 |
| 2,022,364 | Walsh et al. | Nov. 26, 1935 |
| 2,285,963 | Gits et al. | June 9, 1942 |
| 2,330,497 | Larmour | Sept. 28, 1943 |
| 2,342,404 | Jakeway | Feb. 22, 1944 |
| 2,354,857 | Gits et al. | Aug. 1, 1944 |
| 2,431,238 | Friedman | Nov. 18, 1947 |
| 2,499,453 | Bonnet | Mar. 7, 1950 |
| 2,586,978 | Murray | Feb. 26, 1952 |
| 2,724,868 | Kish | Nov. 29, 1955 |